J. M. ROHLFING.
BRAKE BEAM.
APPLICATION FILED JUNE 24, 1911.
1,140,614. Patented May 25, 1915.
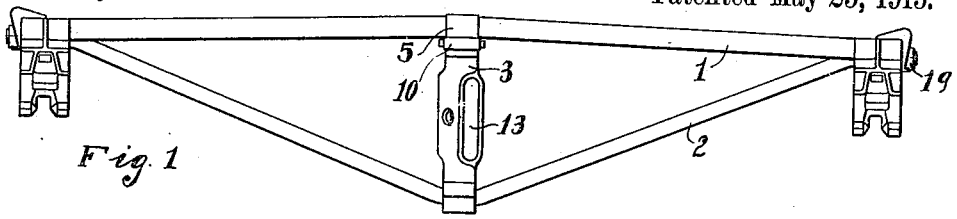
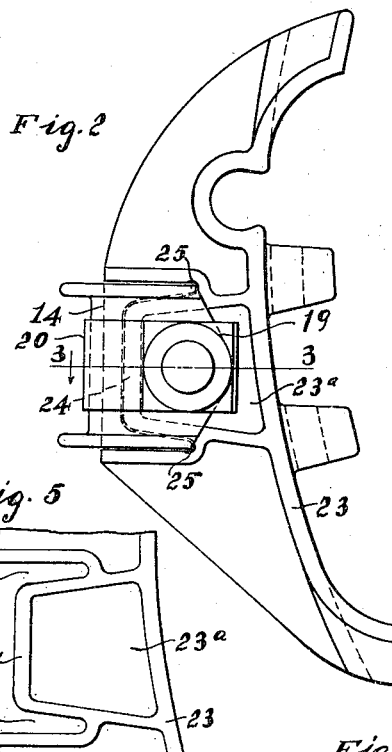
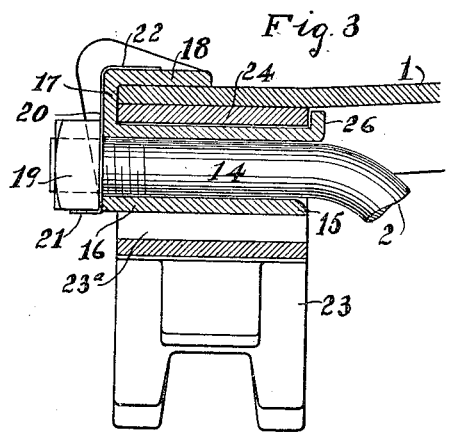
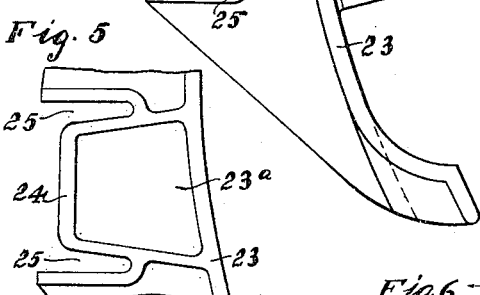
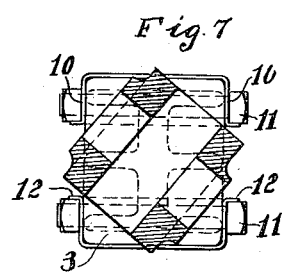
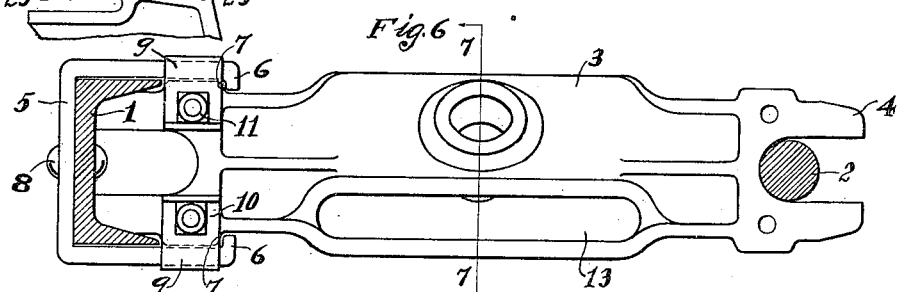
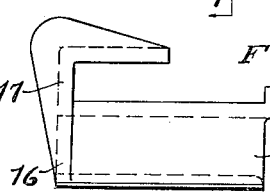
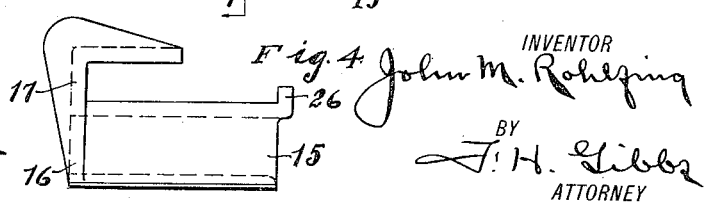
WITNESSES:
K. H. Martin
L. Crosford Handle
INVENTOR
John M. Rohlfing
BY
J. H. Gibbs
ATTORNEY
THE NORRIS PETERS CO., PHOTO-LITHO., WASHINGTON, D. C.

UNITED STATES PATENT OFFICE.

JOHN M. ROHLFING, OF ST. LOUIS, MISSOURI, ASSIGNOR TO AMERICAN CAR AND FOUNDRY COMPANY, OF ST. LOUIS, MISSOURI, A CORPORATION OF NEW JERSEY.

BRAKE-BEAM.

1,140,614.      Specification of Letters Patent.      Patented May 25, 1915.

Application filed June 24, 1911. Serial No. 635,218.

*To all whom it may concern:*

Be it known that I, JOHN M. ROHLFING, residing at St. Louis, Missouri, and being a citizen of the United States, have invented certain new and useful Improvements in Brake-Beams, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a plan view of a brake beam embodying the features of the invention. Fig. 2 is an enlarged end view. Fig 3 is a transverse horizontal section taken on a plane of the line 3—3 of Fig. 2. Fig. 4 is a detailed view of the thrust block employed for connecting the ends of the opposite stress members of the brake beam. Fig. 5 is a detail view of a portion of the brake head. Fig. 6 is an enlarged detail view of the strut employed between the intermediate portions of the stress members, and Fig. 7 is a vertical transverse section taken on the plane of line 7—7, of Fig. 6.

The object of this invention is to provide a brake beam so constructed that the connection of its stress members with the brake heads will not be detrimentally affected by the slight, though almost continuous, movement of the ends of the stress members, relative to each other in use.

A further object is to provide a connecting means between the stress members and the brake heads which may be easily repaired when damaged.

Referring to the drawings by numerals;— 1, indicates the compression member, and 2 the tension member of the beam. The compression member may be straight throughout its length, but is preferably slightly bowed, and comprises a channel section arranged with its web standing vertical, and its flanges turned inwardly. The tension member comprises a member with its opposite ends disposed adjacent the opposite ends of the compression member and with its central portion spaced away from the compression member.

In order that the strut between the stress members may be reversible and interchangeable it comprises a casting 3, formed with its ends identical, and each comprising a yoke 4. The yoke 4, at one end straddles the tension member 2, and is thereby held from displacement on said tension member. The legs of the yoke at the opposite end fit snugly between the flanges of the compression member. To prevent movement of the strut 3, longitudinally of the compression member a strap 5 is fitted about said member and has its opposite ends bent toward each other as at 6, and engaging behind shoulders 7—7, formed upon upper and lower sides of the strut 3. The strap 5 is riveted to the web of the compression member as at 8, and the hollow of the yoke 4, at this end of the strut, is adapted to receive the head of said rivet or rivets. The opposite ends of the strap 5 are fixed rigidly to the end of the strut by binding members 9—9, fitted over the outer surfaces of the ends of said strap and bent to fit against opposite sides of the strut, as at 10—10, being secured by bolts 11—11, extending through the bent portions of said members 9, and through the strut. The extreme ends of each of the members 9 are bent outwardly as at 12—12, and serve to lock the nuts of the bolts 11—11. The intermediate portion of the strut 3 is formed with the usual diagonally disposed bearing pocket 13, for the brake lever, not illustrated. With this construction, it will be apparent that castings from the same pattern may be used with either of its ends fixed to the compression member thus disposing the diagonal pocket 13 to right or left according as one or the other end is fixed to said member.

Since the connections between the opposite ends of the compression and tension members are identical one of said connections only will be described.

The end of the tension member is bent to approximate parallel with the end of the compression member, as at 14, and said parallel portion is extended through a tubular body portion 15 of a cast thrust block, 16. The outer end of the body portion 15 is provided with a hook-shaped lateral extension 17, adapted to extend across the end of the compression member and engage the outer portion of the web thereof, as at 18, for preventing possible disconnection of the ends of the stress members. The extreme end of the tension member is threaded and fitted with a suitable nut 19, and a nut-locking member 20 is positioned between the end of the thrust block 15, and the under-surface of the nut 19, and is bent at one end, as at 21, to embrace a flat surface of the nut, and at its opposite end to embrace the angular portion of the hook-shaped member 17, as at 22.

The brake head 23 is formed with a transverse aperture 23ª, adapted to receive the body portion 15, of the thrust block. A portion 24 of said brake head, forming one of the walls of the aperture 23ª, is disposed between the body portion 15, of the thrust block and the inner surface of the web of the compression member, the brake head thus resting partly within the channel compression member, though parts of the brake head extend beyond the flanges of said channel. The brake head is also formed with depressions 25—25, adapted to receive the flanges of the compression member, which extend upon opposite sides of the wall of aperture 23ª. The inner end of the body portion 15, of the thrust block is formed with a laterally projecting lip 26, adapted to extend over the adjacent portion of the edge of the wall 24.

In assembling the parts, the body portion of the thrust block is first inserted in the aperture 23ª, of the brake head and brought to position with the lip 26 engaging the inner edge of the wall 24, whereupon the two members are slipped over the ends of the compression and tension members, the compression member entering between the outer surface of the wall 24 and the inside face of the hook-shaped extension 17. The end of the tension member enters the aperture in the body portion of the thrust block. Application of the nuts 19, at opposite ends of the beam retain all of the parts in their proper relative positions.

It will be noted that though the structure is extremely simple the parts are held firmly together, and at the same time the brake head is permitted a slight movement relative to the stress members, without affecting the connections between itself and said members. In case of wear, breakage, etc., any of the members comprising the beam may be easily removed without necessitating renewal of any part undamaged.

A further advantage gained by the construction described, resides in that tightening of the nuts 19, will produce a cambering of the beam sufficient to accommodate the face of the brake shoe, carried by the brake head, to the tread of the car wheel in connection with which the beam is to be employed.

What I claim is:—

1. A brake beam comprising a compression member and a tension member, a thrust block carried by one of said members and engaging an end and a side of the other of said members, and a brake head retained by said thrust block, partly within said compression member.

2. A brake beam comprising a compression member and a tension member, a thrust block carried by one of said members and engaging an end and a side of the other of said members, and a brake head formed with an aperture adapted to receive said thrust block, said compression member extending parallel with and at the outer side of said brake head.

3. A brake beam comprising a compression member and a tension member, a thrust block between said members and a brake head independent of said thrust block extending between the thrust block and the compression member and being formed with an aperture to receive the thrust block, said thrust block having a hooked extension adapted to receive an end portion of the compression member.

4. A brake beam comprising a compression member and a tension member, a thrust block, comprising a sleeve adapted to receive an end portion of one of said members, and a brake head retained on said sleeve, partly within the compression member.

5. A brake beam comprising a compression member and a tension member, a thrust block comprising a sleeve adapted to receive an end portion of one of said members, and a brake head retained between said sleeve and the other of said members.

6. A brake beam comprising a compression member and a tension member, a thrust block adapted to receive an end portion of one of said members and being formed with a sleeve adapted to receive an end portion of the other of said members, and a brake head having a portion extending between the compression and tension members.

7. A brake beam comprising a compression member and a tension member, a thrust block adapted to receive an end portion of one of said members and being formed with a sleeve adapted to receive an end portion of the other of said members, a brake head extending between the compression and tension member, and means formed on said sleeve for retaining said brake head in position.

8. A brake beam comprising a channel compression member and a tension member, a thrust block carried by said tension member partly within the channel of said compression member, and a brake head having a portion disposed between said block and compression member.

9. A brake beam comprising a channel compression member and a tension member, a thrust block and a brake head retained between said thrust block and said compression member.

10. A brake beam comprising a channel compression member and a tension member, a thrust block carried by said tension member, and a brake head, said brake head being formed with a recess adapted to receive said compression member and with an aperture adapted to receive said thrust block.

11. A brake beam comprising a compression chamber and a tension member, a perforated thrust block receiving the tension member and a brake head retained in position between said thrust block and said compression member.

In witness whereof I have hereunto set my hand in the presence of two witnesses.

JOHN M. ROHLFING.

Witnesses:
 OSCAR HOCHBERG,
 PAUL M. BEARD.

Copies of this patent may be obtained for five cents each, by addressing the "Commissioner of Patents, Washington, D. C."